(12) United States Patent
Ghosh et al.

(10) Patent No.: US 7,897,049 B2
(45) Date of Patent: Mar. 1, 2011

(54) METHODS FOR TREATING WATER USING IRON

(75) Inventors: Rajat S. Ghosh, Pittsburgh, PA (US);
Dennis Fulmer, Greensburg, PA (US);
Kevin Kitzman, Wenatchee, WA (US);
John Smith, Pittsburgh, PA (US)

(73) Assignee: Alcoa Inc., Pittsburgh, PA (US)

( * ) Notice: Subject to any disclaimer, the term of this patent is extended or adjusted under 35 U.S.C. 154(b) by 724 days.

(21) Appl. No.: 11/749,448

(22) Filed: May 16, 2007

(65) Prior Publication Data
US 2007/0278159 A1 Dec. 6, 2007

Related U.S. Application Data

(60) Provisional application No. 60/803,626, filed on May 31, 2006.

(51) Int. Cl.
*C02F 1/62* (2006.01)
*C02F 1/70* (2006.01)
*C02F 101/18* (2006.01)
*C02F 101/22* (2006.01)

(52) U.S. Cl. ......... 210/631; 210/719; 210/720; 210/726; 210/904; 210/911; 210/912; 210/913

(58) Field of Classification Search .................. 210/719
See application file for complete search history.

(56) References Cited

U.S. PATENT DOCUMENTS

| | | | |
|---|---|---|---|
| 3,575,853 A * | 4/1971 | Gaughan et al. ............ | 210/667 |
| 4,108,770 A | 8/1978 | Roy ................................ | 210/50 |
| 4,565,633 A * | 1/1986 | Mayenkar ..................... | 210/688 |
| 5,160,632 A | 11/1992 | Kleefisch et al. ............. | 210/724 |
| 5,266,213 A | 11/1993 | Gillham ........................ | 210/747 |
| 5,362,394 A | 11/1994 | Blowes et al. ................ | 210/617 |
| 5,487,622 A | 1/1996 | Cherry et al. ................. | 405/128 |
| 5,534,154 A | 7/1996 | Gillham ........................ | 210/668 |
| 5,789,649 A | 8/1998 | Batchelor et al. | |
| 5,837,145 A | 11/1998 | Dzombak et al. ............. | 210/715 |
| 5,975,798 A | 11/1999 | Liskowitz et al. ............. | 405/128 |
| 6,132,623 A | 10/2000 | Nikolaidis et al. ............ | 210/719 |
| 6,207,114 B1 | 3/2001 | Quinn et al. .................. | 422/128 |
| 6,242,663 B1 | 6/2001 | Ponder et al. ................. | 588/205 |
| 6,387,276 B1 | 5/2002 | Nikolaidis et al. ............ | 210/719 |
| 6,602,421 B2 | 8/2003 | Smith ........................... | 210/662 |
| 6,689,485 B2 | 2/2004 | Ponder et al. | |
| 6,719,902 B1 | 4/2004 | Alvarez et al. ................ | 210/601 |
| 6,770,205 B1 | 8/2004 | Schroder et al. | |

(Continued)

OTHER PUBLICATIONS

Ghosh, Rajat S.; "State of SERDP/ESTCP Funded Zero-Valent Iron (ZVI) Research and Technology, SERDP", 21 pages, retrieved from the internet on Apr. 2, 2008 at http://www.frtr.gov/pdf/meetings/k--ghosh_09jun04.pdf).

(Continued)

*Primary Examiner* — Peter A Hruskoci
(74) *Attorney, Agent, or Firm* — Greenberg Traurig, LLP

(57) ABSTRACT

Systems and associated methods for treating contaminant-containing wastewater are provided. The systems generally include a reducing zone for reducing the oxidation-reduction potential of the water and a clean-up zone comprising zero valent iron for removing at least a portion of the contaminant from the contaminant-containing water. The systems are operable to remove one or more contaminants from the contaminant-containing water and are operable for extended durations without clogging due to the formation of iron hydroxides.

8 Claims, 7 Drawing Sheets

U.S. PATENT DOCUMENTS

| | | | |
|---|---|---|---|
| 6,942,807 B1 | 9/2005 | Meng et al. | 210/719 |
| 7,008,964 B2 | 3/2006 | Clausen et al. | 516/20 |
| 7,037,946 B1 | 5/2006 | Reinhart et al. | 516/22 |
| 7,128,841 B2 | 10/2006 | Zhang | 210/757 |
| 7,635,236 B2 * | 12/2009 | Zhao et al. | 405/128.75 |
| 7,799,232 B2 * | 9/2010 | Hayashi et al. | 210/713 |
| 2006/0016762 A1 | 1/2006 | Cha et al. | 210/739 |
| 2006/0021946 A1 | 2/2006 | Hensman et al. | 210/688 |

OTHER PUBLICATIONS

Durant et al., "Remediation of Perchlorate, NDMA, and Chlorinated Solvents Using Nanoscale ZVI" RTDF PRB Workshop Niagra Falls, New York Oct. 16, 2003, pp. 1-31.

Gavaskar et al., "Design Guidance for Application of Permeable Barriers to Remediate Dissolved Chlorinated Solvents" Feb. 1997, pp. 1-192.

Lu et al. "Dechlorination of Hexachlorobenzene by Zero-Valent Iron" Pract. Periodical of Haz., Toxic, and Radioactive Waste Mgmt., vol. 8, Issue 2, Apr. 2004, pp. 136-140 (Abstract only).

University of Cape Town, South Africa Presentation on pe-pH Diagrams, retreived from http://web.uct.ac.za/depts/geolsci/roy/lectures/lec10.pdf in May 2006, pp. 1-15.

Zhang et al., "Removal of Selenate from Water by Zerovalent Iron" J. Environ. Qual. 34; pp. 487-495 (2005) (Abstract only).

Bang, et al., "Chemical reactions between arsenic and zero-valent iron in water," *Water Research* 39(5): 763-770 (2005).

Ramaswami et al., "Batch-mixed iron treatment of high arsenic waters," *Water Research* 35(18): 4474-4479 (2001).

Sun et al., "Treatment of groundwater polluted by arsenic compounds by zero valent iron," *Journal of Hazardous Materials* 129(1-3): 297-303 (2006).

International Search Report and Written Opinion, dated Oct. 30, 2007, from corresponding PCT Application No. PCT/US2007/069016.

Ghose, R.S., Dzombak, D.A. and Luthy, R.G. (1999) "Equilibrium Precipitation and Dissolution of Iron Cyanide Solids in Water", Environmental Engineering Science, vol. 16, No. 4, pp. 293-313.

Meeussen, J.L., Keizer, M.G., van Rjemsdijk, W.H., and de Haan, F.A.M. (1992), "Dissolution Behavior of Iron Cyanide (Prussian Blue) in Contaminated Soils," Environmental Science Technology, vol. 26, No. 9, pp. 1832-1838.

* cited by examiner

METHODS FOR TREATING WATER USING IRON

CROSS-REFERENCE TO RELATED APPLICATION

This application claims priority to U.S. Provisional Patent Application No. 60/803,626, filed May 31, 2006, which is incorporated herein by reference in its entirety.

FIELD OF THE INVENTION

The present invention relates to systems and methods for treating water, such as groundwater, wastewater and the like, using iron.

BACKGROUND OF THE INVENTION

Water generated in industrial processes and groundwater in the subsurface environment may contain various kinds of contamination, including, for example, cyanide, arsenic, chromium, selenium and halogenated organics, to name a few. Various in-situ systems for treating such contaminant-containing water using iron are known in the art. For example, U.S. Pat. No. 5,266,213 to Gillham, U.S. Pat. No. 5,362,394 to Blowes et al., and U.S. Pat. No. 5,534,154 to Gillham all disclose the use of various trench systems that include elemental iron to remove impurities from water flowing therethrough. These patents all require extremely low oxygen levels and long residences times to facilitate the removal of contaminants within the water. It is not always possible to treat contaminated water in an oxygen free environment. Moreover, long residence times restrict clean water production rates.

Various ex-situ treatment systems utilizing iron to remove contaminants from water are also known. For example, U.S. Pat. No. 5,266,213 to Gillham and U.S. Pat. No. 5,534,154 to Gillham both disclose the use of tank systems comprising elemental iron and/or activated carbon to treat contaminated water. Again, these patents both require extremely low oxygen levels within the tanks and long residence times. U.S. Pat. No. 5,837,145 to Dzombak et al. discloses the use of a fixed permeable bed of iron and sand to remove cyanide from water. These systems suffer in that, over time, iron hydroxides will precipitate into a sludge and cause clogging.

Despite these drawbacks, it is still desirable to utilize elemental iron in water treatment. Elemental iron is relatively inexpensive, widely available and is highly reactive with many of the contaminants within water. Thus, there exists a need for improved methods and systems for treating contaminated water using elemental iron.

SUMMARY OF THE INVENTION

In view of the foregoing, a broad objective of the present invention is to enable the prolonged removal of contaminants from wastewater using elemental iron without the need to restrict dissolved oxygen levels. Another objective is to provide high-throughput systems adapted to provide ex-situ and/or in-situ removal of contaminants using elemental iron. A further objective is to enable the prolonged use of such systems and associated methods without forming a significant amount of iron hydroxides.

In addressing one or more of the above objectives, the present inventors have recognized that iron hydroxides are generally formed due to the corrosion of zero valent iron ("ZVI"/$Fe^0$) to $Fe^{2+}$, followed by oxidation of $Fe^{2+}$ to $Fe^{3+}$. The inventors have also recognized that iron hydroxide production is restricted in reducing environments. The present inventors have thus determined that flowing a contaminant-containing water through a reducing zone to reduce the oxidation-reduction ("redox") potential of the contaminant-containing water followed by flowing the contaminant-containing water through a clean-up zone comprising zero-valent iron would facilitate the removal of many contaminants in the contaminant-containing water with restricted production of iron hydroxides.

In one aspect of the invention, an inventive water treatment system is provided, the system including a reducing zone (e.g., a first zone) and a clean-up zone (e.g., a second zone). The reducing zone generally includes an iron-based reducing agent adapted to reduce the redox potential of water flowing therethrough. In this regard, the present inventors have recognized that the corrosion reaction of ZVI to $Fe^{2+}$ significantly reduces the redox potential of the water and that the further corrosion of $Fe^{2+}$ to $Fe^{3+}$ is related to the residence time of the water within the zone. Thus, the residence time of the contaminant-containing water within the reducing zone is generally of sufficient duration to enable the iron-based reducing agent to be corroded to $Fe^{2+}$, but the residence time is not so long that significant amounts of $Fe^{3+}$ are produced from the oxidation of $Fe^{2+}$. In other words, the average residence time of the water within the reducing zone may be of sufficient duration to lower the redox potential of the contaminant-containing water, thereby significantly reducing the rate of $Fe^{2+}$ oxidation and hence the quantity of corrosion products (e.g., amorphous iron oxides and hydroxides). Preferably, the residence time in the reducing zone is sufficient to lower the redox potential of the water exiting the reducing zone to not greater than 0 millivolts, such as not greater than −50 millivolts, preferably not greater than −100 millivolts, or even not greater than −200 millivolts. As noted, such reduction conditions will restrict $Fe^{3+}$ production, and correspondingly iron hydroxide production.

The residence time of the contaminant-containing water within the reducing zone is related to a variety of factors, such as the desired redox potential, described above, the total mass of iron-based reducing agent within the reducing zone, and the total surface area of the iron-based reducing agent within the reducing zone, to name a few. Such residence times and other corresponding variables are within the scope of the present invention insofar as the redox potential of the contaminant-containing water is lowered and with insubstantial $Fe^{3+}$ production.

In one embodiment, the iron-based reducing agent comprises ZVI particles and the reducing column includes not greater than 10 wt % ZVI, such as not greater than 5 wt % ZVI, but at least about 1 wt % ZVI. In this embodiment, the ZVI particles have an average diameter of at least about 0.1 mm to not greater than about 1.2 millimeters, and often an average diameter of at least about 0.35 mm to not greater than about 0.65 mm. Accordingly, the ZVI particles have an average surface area of at least about 0.03 mm$^2$ to not greater than about 3.8 mm$^2$, and in this embodiment, the total available ZVI surface area is generally at least about 450 mm$^2$ to not greater than about 55,000 mm$^2$. In this embodiment, the present inventors have found that the average residence time of the contaminant-containing water within the reducing zone should be at least about 45 minutes, such as at least about 60 minutes, or even at least about 75 minutes. The residence time, however, should be restricted to prevent the formation of $Fe^{3+}$ and iron hydroxides. Hence, in this embodiment, the residence time is generally not greater than 4 hours, such as not greater than 3 hours, or even not greater than 2 hours.

Thus, the system is capable of relatively high cleaning rates relative to prior art systems, which require extended residence times to achieve the desired contaminant removal rates.

As noted, the residence time may be related to the mass of ZVI in the reducing zone. For reducing zones comprising at least about 1 wt % to not greater than about 10 wt % ZVI, the residence time per mass of ZVI should be at least about 1 minute per kilogram ZVI, such as at least about 2 minutes per kilogram ZVI, or at least about 3 minutes per kilogram ZVI, or even at least about 4 minutes per kilogram ZVI. The residence time per mass of ZVI should not exceed 25 minutes per kilogram, such as not greater than 20 minutes per kilogram, or even not greater than 15 minutes per kilogram, or even not greater than 10 minutes per kilogram.

The iron-based reducing agent may include materials other than ZVI particles. For example, the reducing agent may also/alternatively comprise other iron containing media such as bauxite residue, iron shavings/borings and/or bauxite. Correspondingly, the residence time of the contaminant-containing water may vary according to the utilized reducing agent(s) and reaction system utilized (e.g., plug-flow or CSTR).

The reducing zone may include other materials. For example, the reducing zone may include a filler material for facilitating flow of the contaminant-containing water through the reducing zone while enabling sufficient contact between the reducing agent and contaminant-containing water. The filler material may include, for instance, sand.

Any suitable amount of reducing agent and/or filler may be used within the reducing zone so long as the goal(s) of lowered redox potential and/or restricted $Fe^{3+}$ production is/are accomplished. For instance, the reducing zone may include not greater than 1 gram of reducing agent (e.g., ZVI) per 10 grams of filler (e.g., sand), such as not greater than 0.5 gram of reducing agent per 10 grams of filler, or even not greater than 0.2 gram of reducing agent per 10 grams of filler. In one embodiment, the reducing zone includes not greater than 10 wt % ZVI, such as not greater than 7.5 wt % ZVI, or even not greater than 5 wt % ZVI. In this embodiment, the reducing zone should include at least about 0.5 wt % ZVI, such as at least about 1 wt % ZVI.

As noted, the reducing zone acts to lower the redox potential of the effluent water of the reducing zone. The reducing zone may also serve other functions. For example, the reducing zone may also act as a pre-cleaning zone, wherein $Fe^{2+}$ corroded from elemental iron may react with contaminants within the contaminant-containing water. Hence, in some instances, the reducing agent may serve as both a reducing agent and a cleaning/binding agent, and the reducing zone may serve as both a reducing zone and a contaminant removal zone.

As noted above, the inventive system also includes a clean-up zone. The clean-up zone is downstream of the reducing zone and includes ZVI to facilitate removal of contaminants from the contaminant-containing water (e.g., via precipitation). Since the redox potential of the incoming contaminant-containing water has been sufficiently lowered via the reducing zone, the clean-up zone may include a large amount of ZVI to facilitate water treatment. For example, the clean-up zone may include up to 100 wt % ZVI within the zone, such as at least about 50 wt % ZVI, or even at least about 75 wt % ZVI. The clean-up zone may also include other materials, such as a filler material (e.g., sand) to occupy the remaining volume of the clean-up zone.

The residence time within the clean-up zone is generally similar to the residence time within the reducing zone, and thus may include any of the residence times discussed above. However, the residence time within the clean-up zone may be shortened or extended, as necessary, to achieve the desired cleaning rates (e.g., shortened or extended relative to an average amount of contaminants contained within the contaminant-containing water).

The reducing zone and clean-up zone of the treatment system may be configured in a variety of manners. For example, an ex-situ system may include a first column comprising the reducing agent and a second column comprising the ZVI. Alternatively, an ex-situ system may include a single column comprising both zones separated by a suitable boundary (e.g., sand, a membrane). Other ex-situ systems (e.g., tanks) may be employed in accordance with the present invention. In-situ systems, such as trenches and/or permeable reactive barriers (PRBs), may also be employed. In one embodiment, the reducing zone and clean-up zone are distinct zones within separate regions of the treatment system. In another embodiment, the reducing zone and clean-up zone are partially overlapping.

The zero valent iron within the clean-up zone and, optionally, the reducing zone, may be of any suitable physical form, such as iron filings, iron pellets, shredded scrap iron, iron cuttings, and iron dust. In one embodiment, the ZVI is of a granular form and has an average particle diameter of at least about 0.1 mm to not greater than about 1.2 mm, as described above.

The present system and methods are advantageous in that low dissolved oxygen levels within the water are not required for operation. The present inventors have found that, while low dissolved oxygen levels are preferred, the present system is capable of cleaning contaminant-containing water that contains normal dissolved oxygen levels (e.g., 3-7 mg/L dissolved oxygen) for extended periods of time.

The pH of the incoming water should generally be not greater than 8, such as a pH of at least about 5 to a pH of not greater than 8, such as a pH in the range of from about 6 to about 8. If necessary, the water may be pretreated with an acid to reduce the pH of the water entering the reducing zone.

These and other aspects, advantages, and novel features of the invention are set forth in part in the description that follows and will become apparent to those skilled in the art upon examination of the following description and figures, or may be learned by practicing the invention.

DETAILED DESCRIPTION

Figure 1:
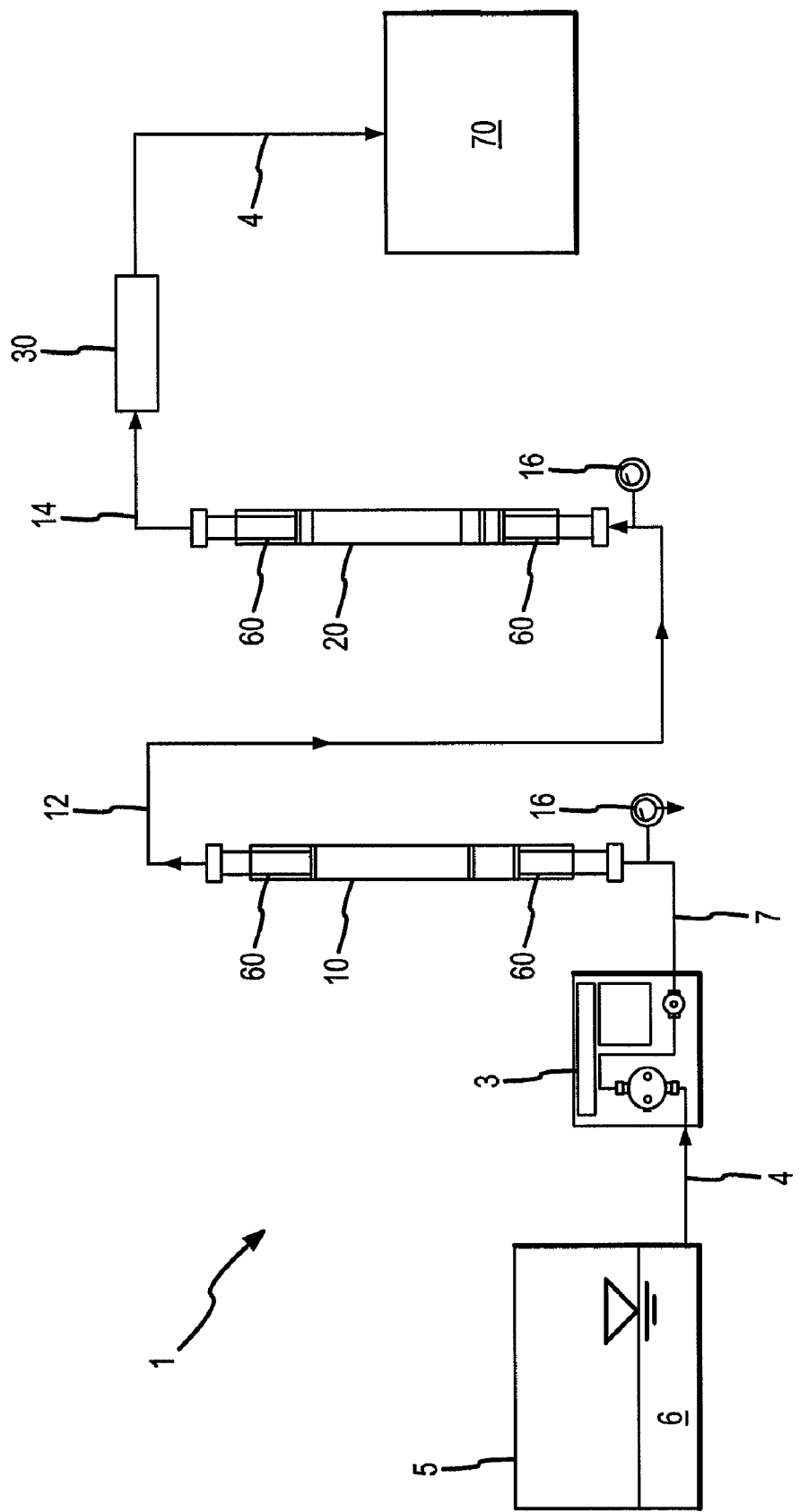
FIG. 1 is a schematic view of one embodiment of a treatment system useful in accordance with the present invention.

Reference will now be made to the accompanying figures, which at least assist in illustrating various pertinent features of the present invention. One embodiment of a treatment system is illustrated in FIG. 1. In the illustrated embodiment, the treatment system 1 includes a reducing column 10 and a clean-up column 20. A contaminant-containing water source 5 is fluidly interconnected to the inlet of the reducing column 10 via piping 7. The clean-up column 20 is fluidly interconnected to the outlet of the reducing column 10 via piping 12. An optional third treatment zone 30 may be fluidly interconnected to the outlet of the clean-up zone 20 via piping 14, as discussed in further detail below. One or more pumps 3 may be utilized to facilitate flow of the contaminant-containing water through the system 1, as indicated by flow direction arrow 4. Pressure gauges 16 may be utilized to monitor the pressure within one or more of the columns 10, 20. While the system has been illustrated with a single reducing column and a single clean-up column, any number of column(s), or similar apparatus, could be used.

In operation, contaminant-containing water 6 from a source 5 flows into and through the reducing column 10, where the redox potential of the water 6 is reduced via interaction with an iron-based reducing agent (e.g., ZVI) of the reducing column 10. Preferably, the residence time of the water within the reducing column 10 is sufficient to lower the redox potential of the water exiting the reducing column 10 to not greater than 0 millivolts, but is not so long as to promote the formation of iron hydroxides.

After reduction oxidation potential of the water in the reducing column, the water 6 flows to the clean-up column 20, which contains at least 50 wt % ZVI, where contaminants within the water react with the $Fe^{2+}$ and/or $Fe^{3+}$ and are precipitated out of the water 6. More particularly, $Fe^{2+}$ may react with one or more of cyanide, chromium, arsenic, selenium, radionuclides, pathogens and/or halogenated organics (e.g., chlorinated organics such as chloroethenes, chlorobenzenes, and chloromethanes) within the water 6. For example, $Fe^{2+}$ may react with cyanide complexes to form one or more of Prussian Blue, Tumbull's Blue and/or Berlin White. Since ZVI also reacts well with many bacteria and viruses, the treatment system 1 can also be employed to disinfect water that contains such bacteria and/or viruses. Thus, the system 1 is adapted to removal a plurality of different contaminants from contaminant-containing water.

The water 6 may also pass through one or more filters 60 to filter out any large contaminants within the water. After treatment in the clean-up column 20 and, optionally, the third treatment zone 30, the treated water is passed to a reservoir 70 (e.g., via piping 14) or is sent to another facility.

As noted, the system 1 may include an optional third treatment zone 30 for further removing contaminants from the water 6. For example, the third treatment zone 30 may include a scavenging material, such as a biological material (e.g., compost materials, such as spent mushrooms or leaves) and/or activated carbon, among others. The third treatment zone 30 is generally fluidly interconnected to the outlet of the clean-up zone 20.

As noted above, the reducing column may also facilitate removal of contaminants. For example, the reducing conditions produced in the reducing column may reduce chromium (VI) to chromium (III), which will be precipitated out as chromium oxide and/or chromium hydroxide.

As noted above, the water treatment system 1 may be utilized for treating a variety of contaminant-containing waters. In a particular embodiment, the treatment system 1 may be utilized to treat industrial wastewater from aluminum smelting activities to remove free cyanide and associated metal cyanide complexes. It has been found that systems employing the above-described dual zone approach are capable of removing nearly all total cyanide within contaminant-containing water, including nearly all free cyanide, over substantial periods of time and pore volumes. Indeed, such systems may be capable of removing at least about 90 wt % of the total cyanide within the contaminant-containing water over extended periods of continuous operation, such as removal of at least about 95 wt % total cyanide, or even at least about 97 wt % total cyanide, and, in some instances, at least about 99 wt % of the total cyanide from the contaminant-containing water. The present system is also capable of removing at least about 95 wt % free cyanide from contaminant-containing water over extended periods of continuous operation, such as removal of at least about 97 wt % free cyanide, or even at least about 99 wt % free cyanide, and, in some instances, at least about 99.5 wt % free cyanide from the contaminant-containing water. The effluent exiting the treatment system 1 thus generally contains very low levels of cyanide, such as not greater than 100 ppb total cyanide, or such as not greater than 50 ppb total cyanide, or such as not greater than 25 ppb total cyanide, or such as not greater than 12 ppb total cyanide. These removal rates may be achieved over extend periods of operation without significant production of iron hydroxides, such as over at least about 4 weeks, or even at least 11 weeks and/or at least 1050 pore volumes, or even at least about 7500 pore volumes.

Figure 2:
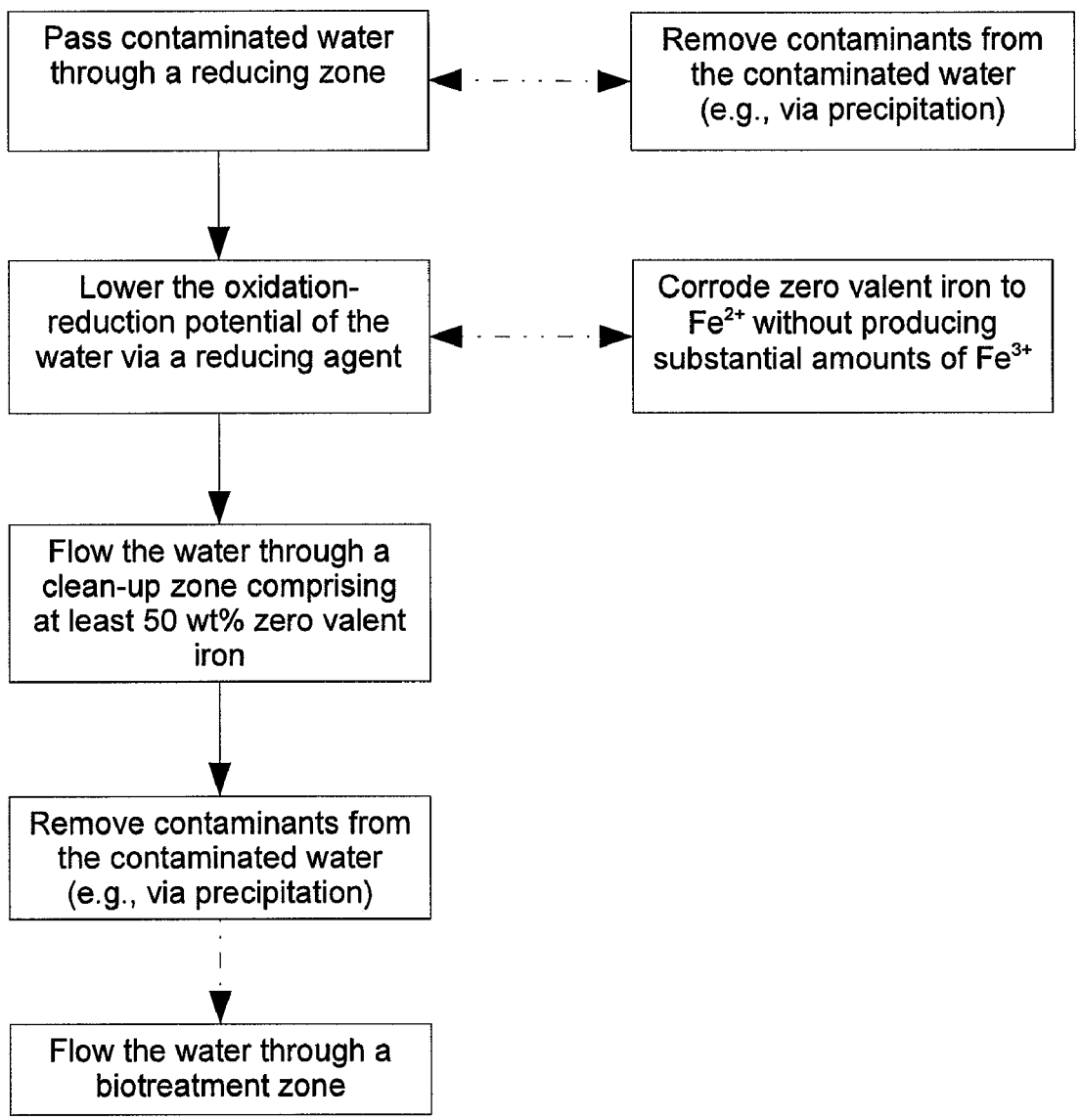
FIG. 2 is a flow chart illustrating one embodiment of methods useful in accordance with the present invention.

In another aspect of the invention, an inventive method of treating contaminant-containing water is provided. With reference to FIG. 2, the method generally includes the steps of passing contaminant-containing water through a reducing zone, lowering the redox potential of the water, flowing the water through a clean-up zone comprising zero valent iron, and removing contaminants from the contaminant containing water. The reducing zone includes a reducing agent (e.g., ZVI) and thus the lowering step may include the step of corroding the reducing agent (e.g., $Fe^0 \rightarrow Fe^{2+} + 2e-$) to lower the redox potential of the water and without production of substantial amounts of $Fe^{3+}$. In other words, the effluent exiting the reducing zone may include an insubstantial amount of $Fe^{3+}$ The method may further include the steps of removing contaminants during the passing and flowing steps, thereby achieving contaminant removal in both zones. For example, the removing step may include the step of corroding ZVI to $Fe^{2+}$, forming precipitates from the $Fe^{2+}$ and contaminants within the contaminant-containing water and removing the precipitates from the contaminant-containing water (e.g., via adhesion/interaction with the reducing agent, filler and/or ZVI media). The method may include any of the configurations and/or arrangements described above for the water treatment system.

EXAMPLES

Example 1

Prior Art System

Figure 3:
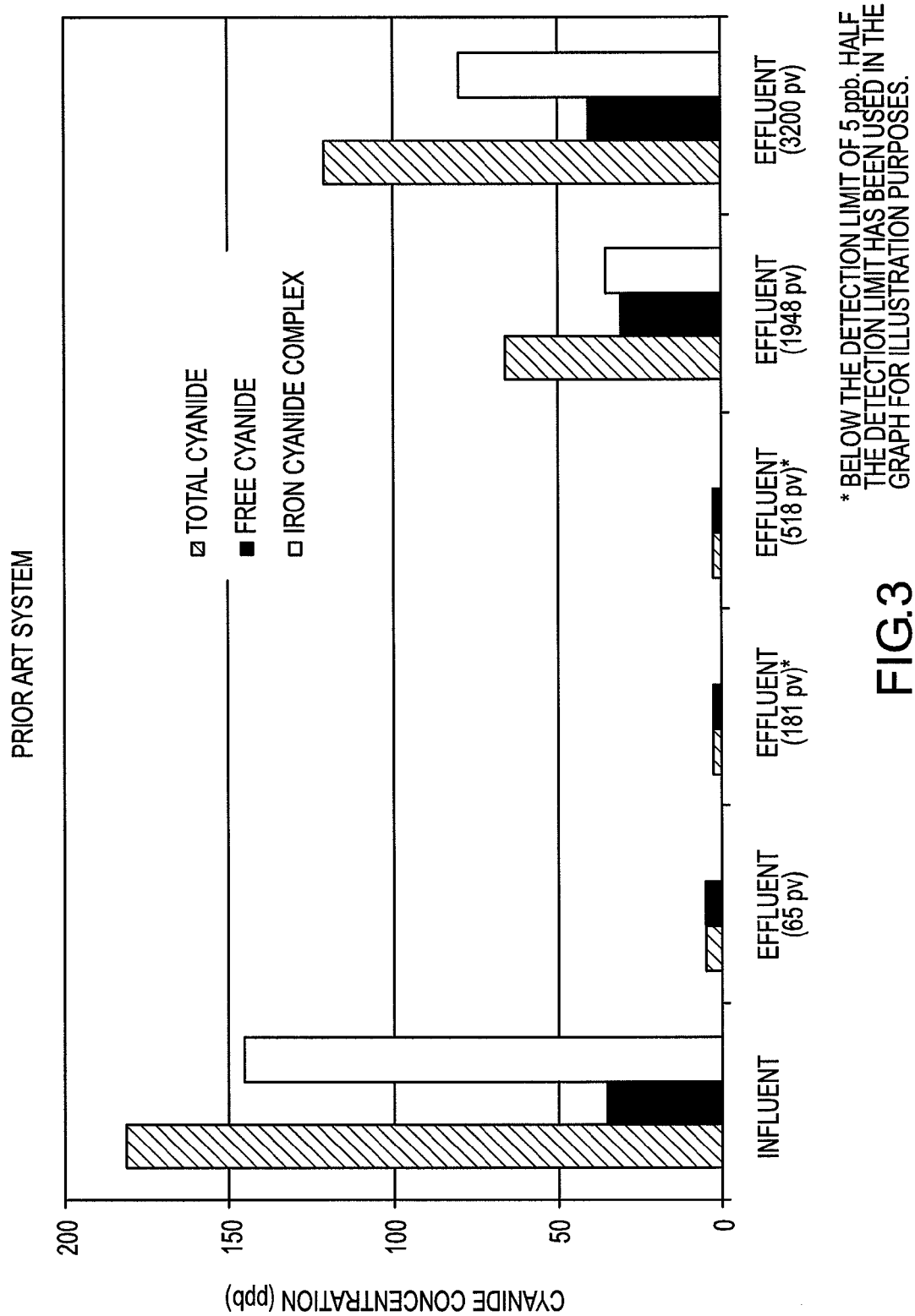
FIG. 3 is a graph illustrating cyanide removal results obtained from operation of a prior art system.

A single column comprising ZVI in sand is constructed in accordance with U.S. Pat. No. 5,837,145. Ferro- and free cyanide spiked synthetic water resembling aluminum smelting activities impacted groundwater is passed through the single-column system and the effluent is routinely monitored for total cyanide, pH, redox potential and dissolved oxygen. FIG. 3 provides a graphical representation of column performance using the single column. The cyanide broke through the column within about 800 pore volumes and hydraulic failure was noticeable around 2000 pore volumes.

Example 2

New, Lab-Scale System

Figure 4:
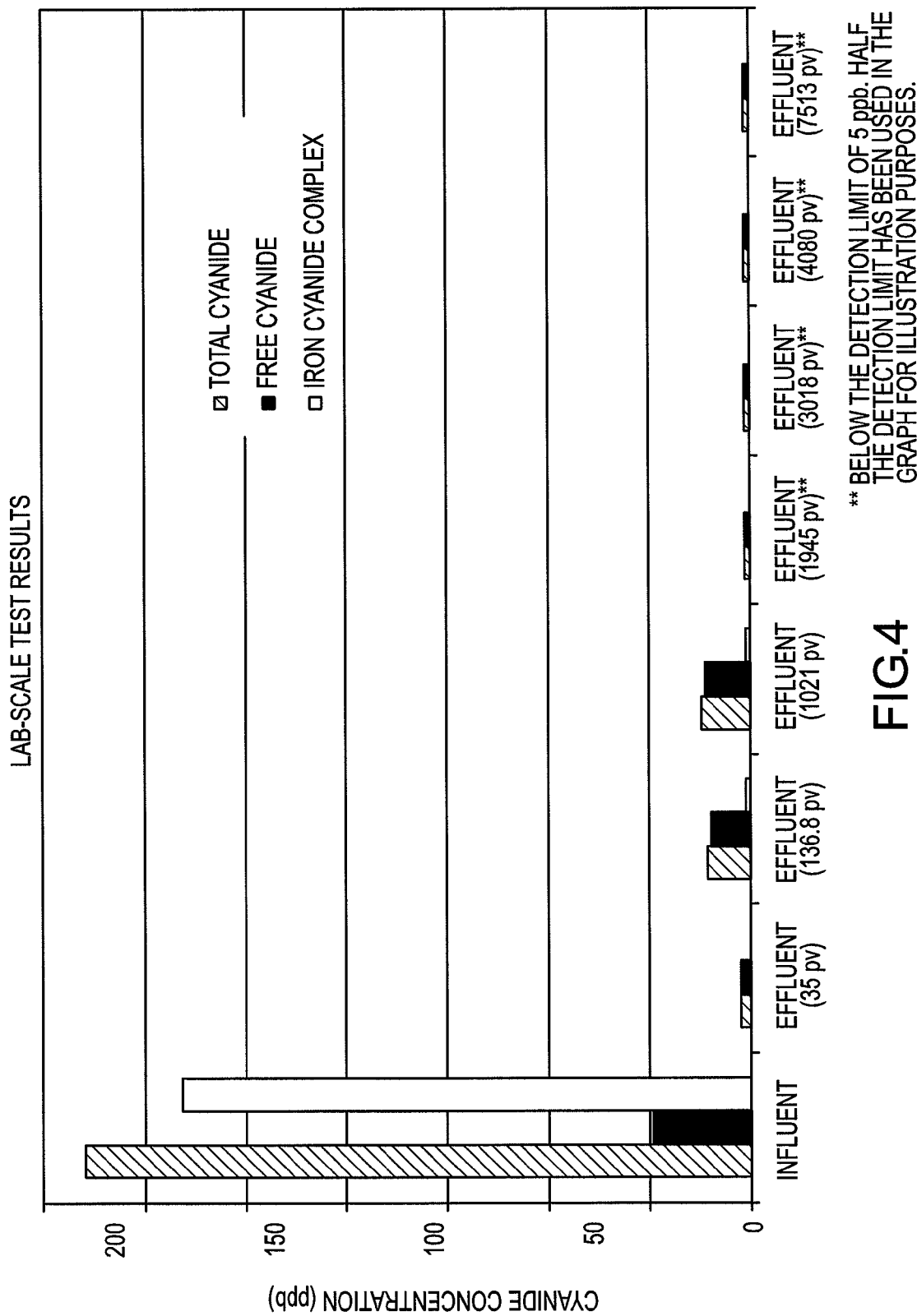
FIG. 4 is a graph illustrating cyanide removal results obtained from a treatment system produced in accordance with the present invention.

A lab-scale system including a reducing column and a clean-up column is fabricated. The reducing column includes 5 wt % ZVI in sand and the clean-up column includes 100% ZVI. Ferro- and free cyanide spiked synthetic water resembling aluminum smelting activities impacted groundwater is passed through the reducing column and then the clean-up column and the effluent is routinely monitored for total cyanide, pH, redox potential and dissolved oxygen. The effluent total cyanide concentration is reduced to non-detectable levels within 1945 pore volumes of operation and remains non-detect over extended periods of operation (>7500 pore volumes). FIG. 4 provides a graphical representation of the achieved cyanide concentration levels relative to pore volumes. Insubstantial iron hydroxide production is witnessed during the operating period. No hydraulic failure occurs during the operation period.

Example 3

New, Pilot-Scale System

Figure 5:
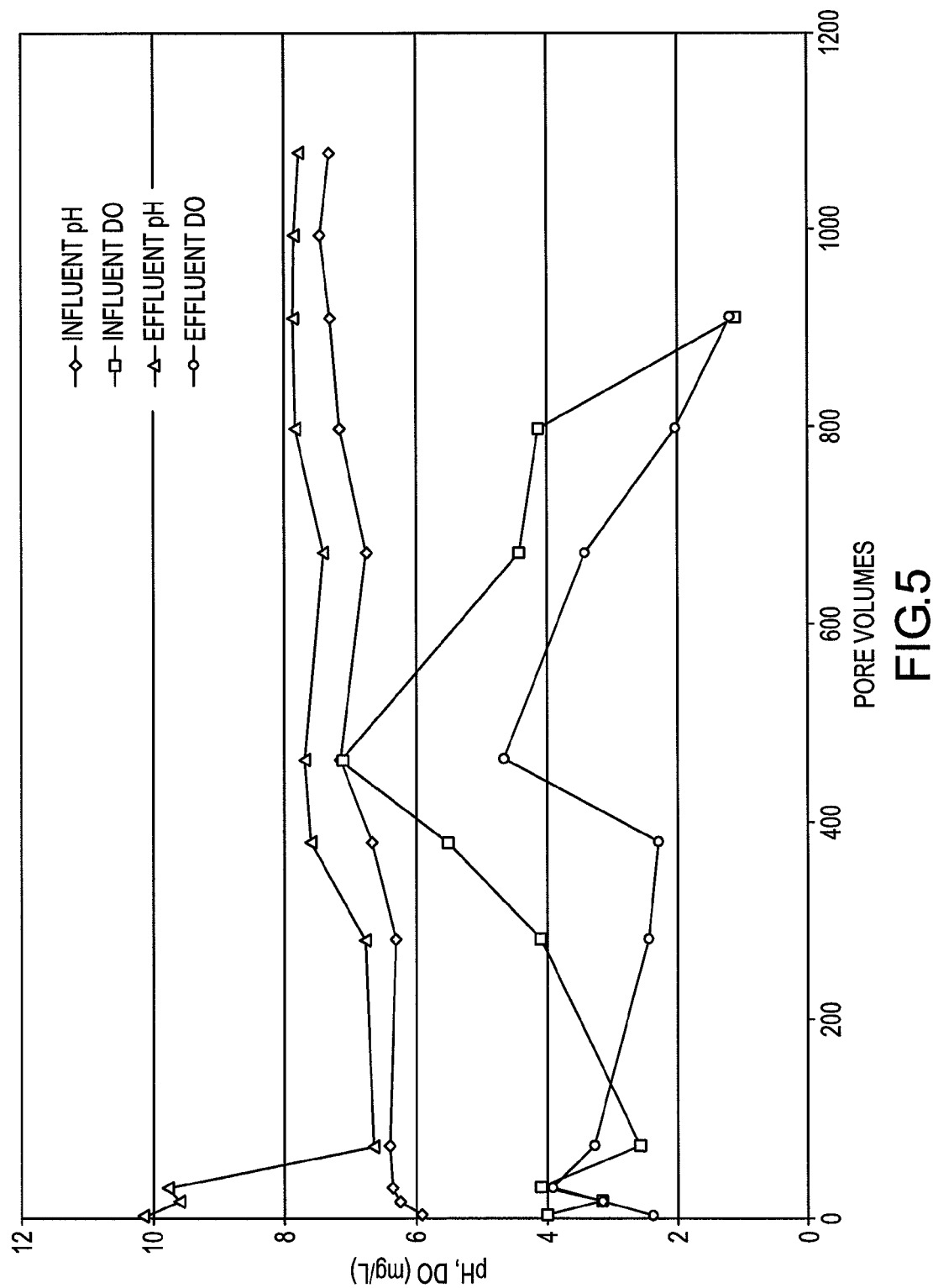
FIG. 5 is a graph illustrating influent and effluent pH and dissolved oxygen levels obtained from a treatment system produced in accordance with the present invention.
Figure 6:
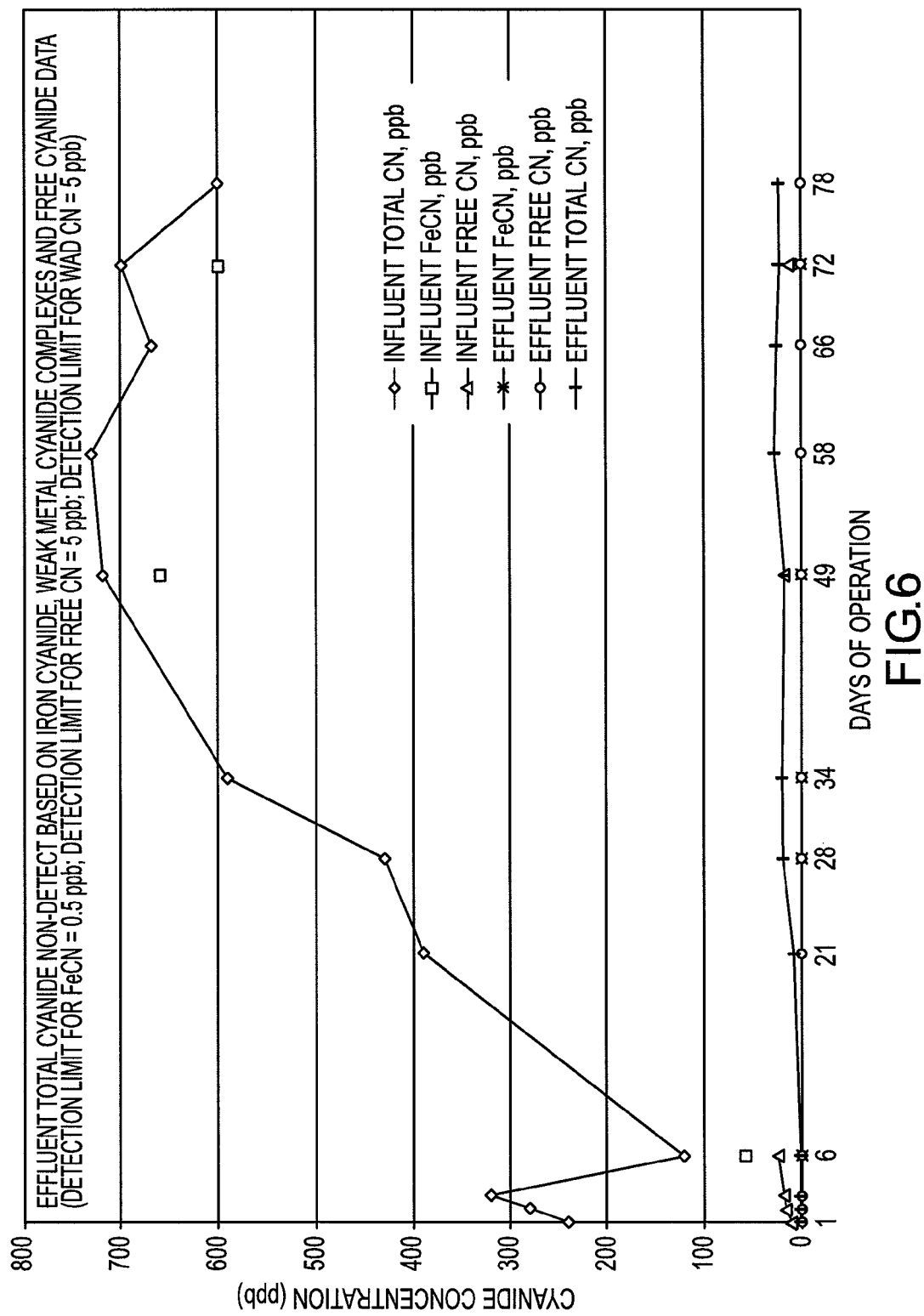
FIG. 6 is a graph illustrating influent and effluent cyanide levels obtained from a treatment system produced in accordance with the present invention.

A pilot unit including a reducing column and a clean-up column is fabricated. The reducing column comprises a 26 inch bed of 5 wt % ZVI (CC-1190 ZVI, supplied by Connelly GPM Inc.) in sand (Filpro No. 1 sand) and the clean-up column comprises a 26 inch bed of 100 wt % ZVI (CC-1190 ZVI, supplied by Connelly GPM Inc.). Both columns have an internal diameter of about 6 inches. A vertical upflow stream of cyanide-containing water (e.g., from an aluminum smelting facility) is flowed through the reducing column and then the clean-up column at a flow rate of about 82 milliliters per minute, on average. The effluent is monitored for pH, dissolved oxygen and cyanide concentrations. The pilot unit is operated for 11 weeks for a total reactive pore volume of ~1100, during which time 99.6% total cyanide and, statistically, 100% free cyanide, weak metal cyanide complexes and iron cyanides are removed. Insubstantial iron hydroxide production is witnessed during the operating period. No hydraulic failure occurs during the operation period. FIG. 5 illustrates the influent and effluent pH and dissolved oxygen levels during the operation period. FIG. 6 is a graph illustrating the achieved cyanide removal during the operation period. Even with extremely high influent cyanide concentrations (e.g., >700 ppb), the effluent exiting the system contains less than 30 ppb total cyanide for the duration of the test, and less than 20 ppb for significant periods of operation. In this example, the average flow rate of the contaminant-containing water per cross-sectional area of the column is from about 150 gallons/(day-ft$^2$) to about 500 gallons/(day-ft$^2$).

Figure 7:
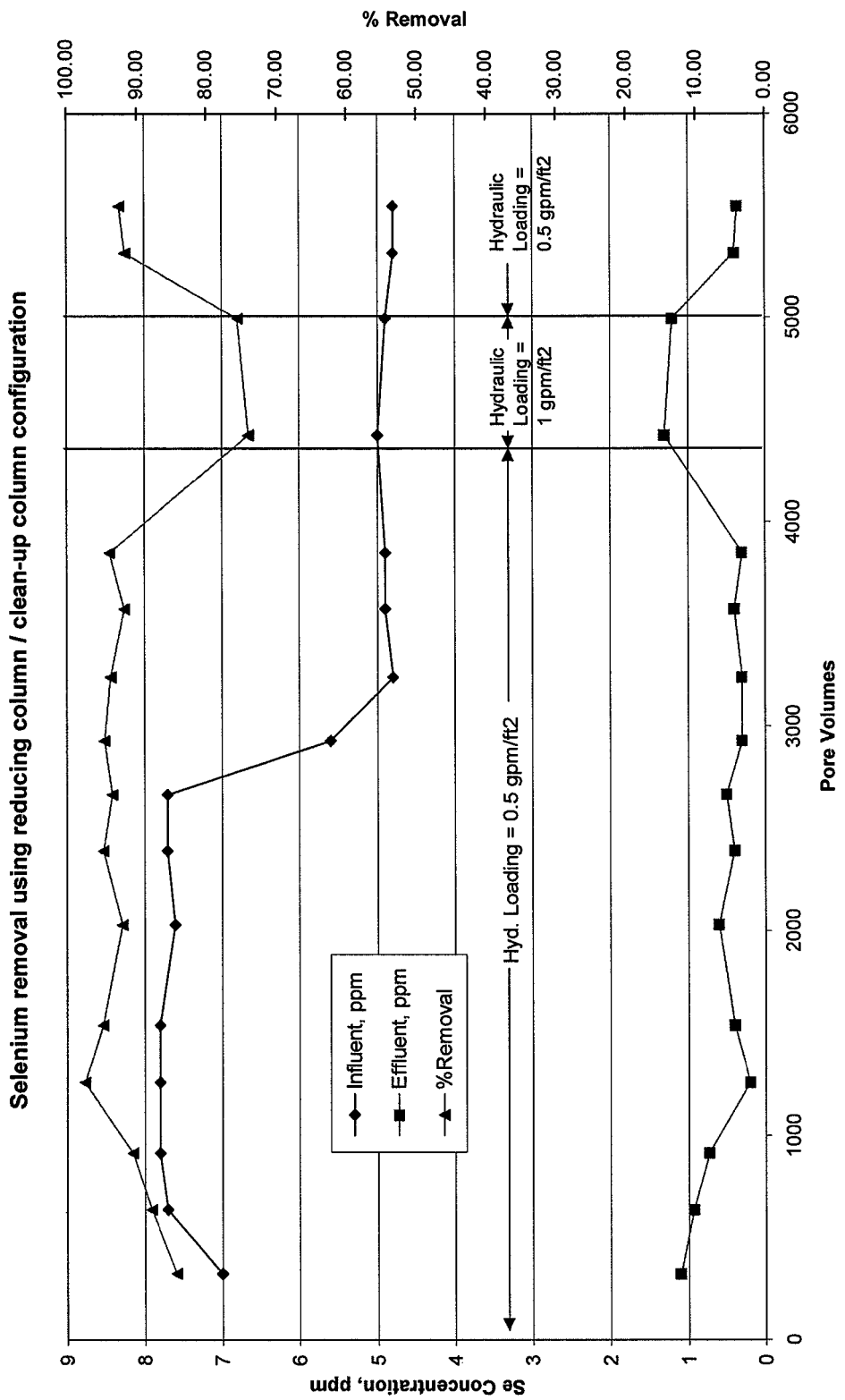
FIG. 7 is a graph illustrating influent and effluent selenium levels obtained from a treatment system produced in accordance with the present invention.

FIG. 7 is a graph illustrating achieved selenium removal utilizing a lab-scale unit having a reducing column and a clean-up column, similar to that described above in Example 2. The pilot unit consistently achieved a selenium removal efficiency of at least 90% during operation at hydraulic loading rates of about 0.5 gallon per minute per square foot. The removal efficiency dropped to about 75% during operation at hydraulic loading rates of about 1 gallons per minute per square foot.

The foregoing description is considered as illustrative only of the principles of the invention. Furthermore, since numerous modifications and changes will readily occur to those skilled in the art, it is not desired limit the invention to the exact construction and process shown and described above. Accordingly, resort may be made to all suitable modifications and equivalents that fall within a scope of the invention as defined by the claims which follow.

What is claimed is:

1. A method for purifying water, the method, comprising:
   passing contaminant-containing water through a reducing zone having a reducing agent present in an amount of less than about 10 wt % of the reducing zone at a pH of at least about 5, wherein the reducing agent comprises an iron-containing media, wherein the contaminant-containing water comprises at least one of cyanide, arsenic, chromium and selenium;
   reducing the oxidation-reduction potential of the contaminant-containing water in the reducing zone to not greater than about 0 mV, and restricting $Fe^{3+}$ and iron hydroxide production;
   flowing the contaminant-containing water from the reducing zone to a clean-up zone, the clean-up zone comprising at least 50 wt % zero valent iron; and
   removing contaminants from the contaminant-containing water, wherein the removing step comprises: corroding zero valent iron into $Fe^{2+}$ using the contaminant-containing water; forming precipitates from the $Fe^{2+}$ and contaminants of the contaminant-containing water; and removing precipitates from the water.

2. The method of claim 1, wherein the reducing step comprises:
   corroding zero valent iron into at $Fe^{2+}$ using the contaminant-containing water.

3. The method of claim 2, wherein the contaminant-containing water exiting the reducing zone comprises an insubstantial $Fe^{3+}$ concentration.

4. The method of claim 2, wherein the contaminant-containing water exiting the reducing zone has a oxidation-reduction potential of not greater than about zero millivolts.

5. The method of claim 2, wherein the flowing step occurs before a substantial amount of $Fe^{3+}$ is produced within the water.

6. The method of claim 1, wherein water exiting the clean-up zone comprises less than 30 ppb total cyanide.

7. The method of claim 1, wherein the removing step occurs during both the passing and flowing steps.

8. The method of claim 1, further comprising:
   flowing the water from the clean-up zone to a bio-treatment zone.

* * * * *